United States Patent
Das et al.

(10) Patent No.: US 6,781,078 B2
(45) Date of Patent: Aug. 24, 2004

(54) SYSTEM AND METHOD FOR IDENTIFYING POTENTIALLY LIFE HARMING MAILPIECES IN AN INCOMING MAIL STREAM

(75) Inventors: Pradeep K. Das, Bethel, CT (US); John W. Sussmeier, Cold Spring, NY (US); Gregory P. Skinger, Southbury, CT (US); David W. Spencer, Avon, CT (US)

(73) Assignee: Pitney Bowes Inc., Stamford, CT (US)

( * ) Notice: Subject to any disclaimer, the term of this patent is extended or adjusted under 35 U.S.C. 154(b) by 118 days.

(21) Appl. No.: 10/186,469

(22) Filed: Jun. 28, 2002

(65) Prior Publication Data

US 2004/0000508 A1 Jan. 1, 2004

(51) Int. Cl.[7] .................................................. B07C 5/04
(52) U.S. Cl. ........................................ 209/586; 209/584
(58) Field of Search ................................ 209/441, 555, 209/557, 584, 587, 592, 645, 659, 900

(56) References Cited

U.S. PATENT DOCUMENTS

| | | | |
|---|---|---|---|
| 4,831,555 A | 5/1989 | Sansone et al. | |
| 5,971,391 A | 10/1999 | Salomon et al. | |
| 6,003,857 A | 12/1999 | Salomon et al. | |
| 6,135,441 A | 10/2000 | Belec et al. | |
| 6,217,020 B1 | 4/2001 | Supron et al. | |
| 6,311,892 B1 * | 11/2001 | O'Callaghan et al. | 235/375 |
| 6,328,300 B1 | 12/2001 | Stefan et al. | |
| 6,508,365 B1 * | 1/2003 | Cacace-Bailey et al. | 209/584 |
| 6,521,854 B2 * | 2/2003 | Tanimoto | 209/586 |
| 2003/0121839 A1 * | 7/2003 | Ryan et al. | 209/589 |

* cited by examiner

*Primary Examiner*—Donald P. Walsh
*Assistant Examiner*—Kaitlin Joerger
(74) *Attorney, Agent, or Firm*—Alberta A. Vitale; Angelo N. Chaclas; George M. Macdonald

(57) ABSTRACT

The present invention is directed to a system and method that identifies potentially life harming mailpieces. The system generally comprises a mailpiece sorting apparatus which includes a scanner, a scale, a appropriate thickness and length measurement sensors and compartments or bins for receiving sorted mailpieces, an OCR system for reading address information, one or more databases, microprocessor based control system, a document scanner and email functionality. The system and method captures and analyzes mailpiece metrics. The metrics are incorporated into a decision making process as to how the mailpiece should be sorted. The system and method identifies potentially life harming mailpieces with mailpiece processing so as to help deter delays in incoming mail delivery caused by the presence of life harming material in mailpieces and helps to protect the intended recipients from harm.

24 Claims, 15 Drawing Sheets

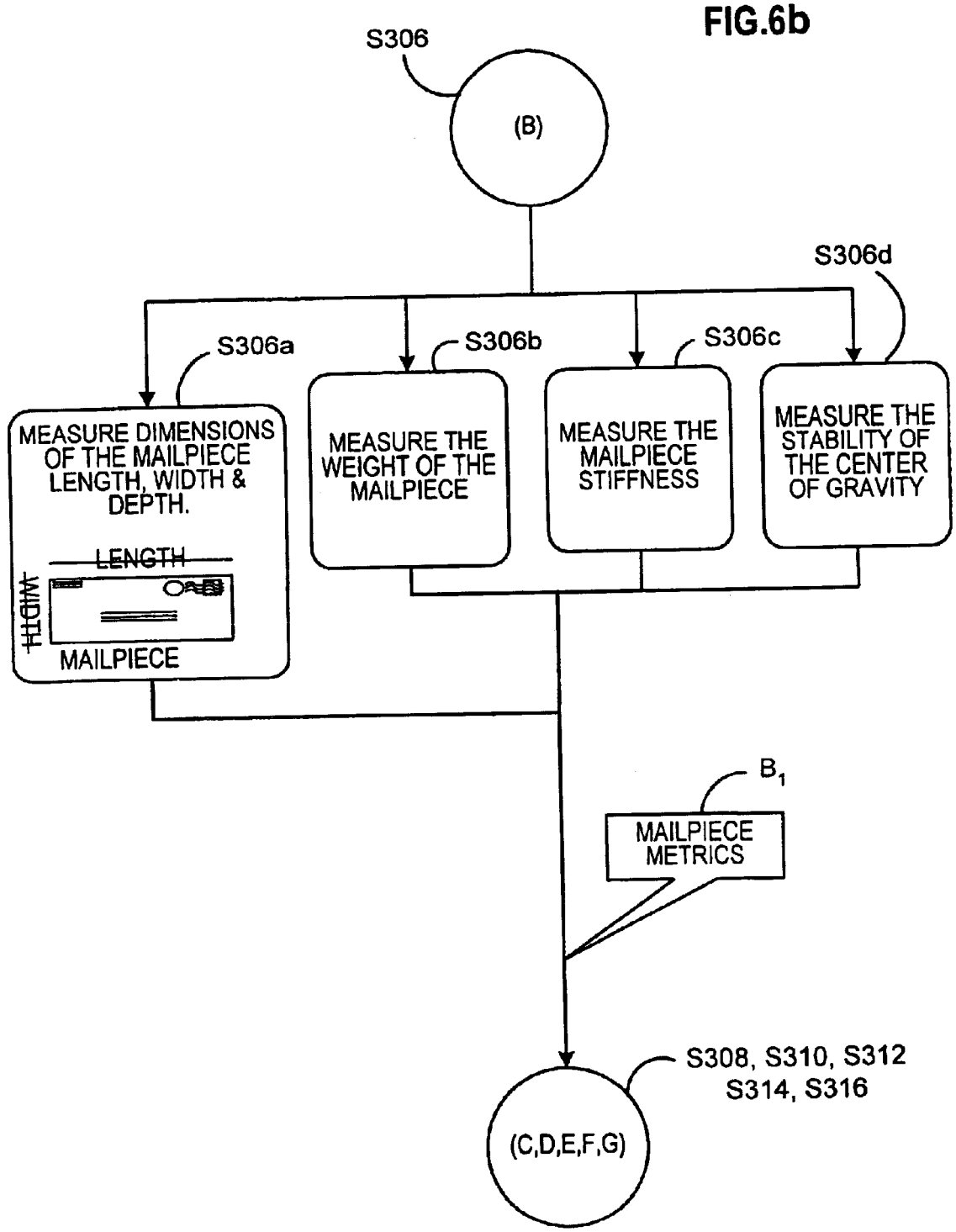

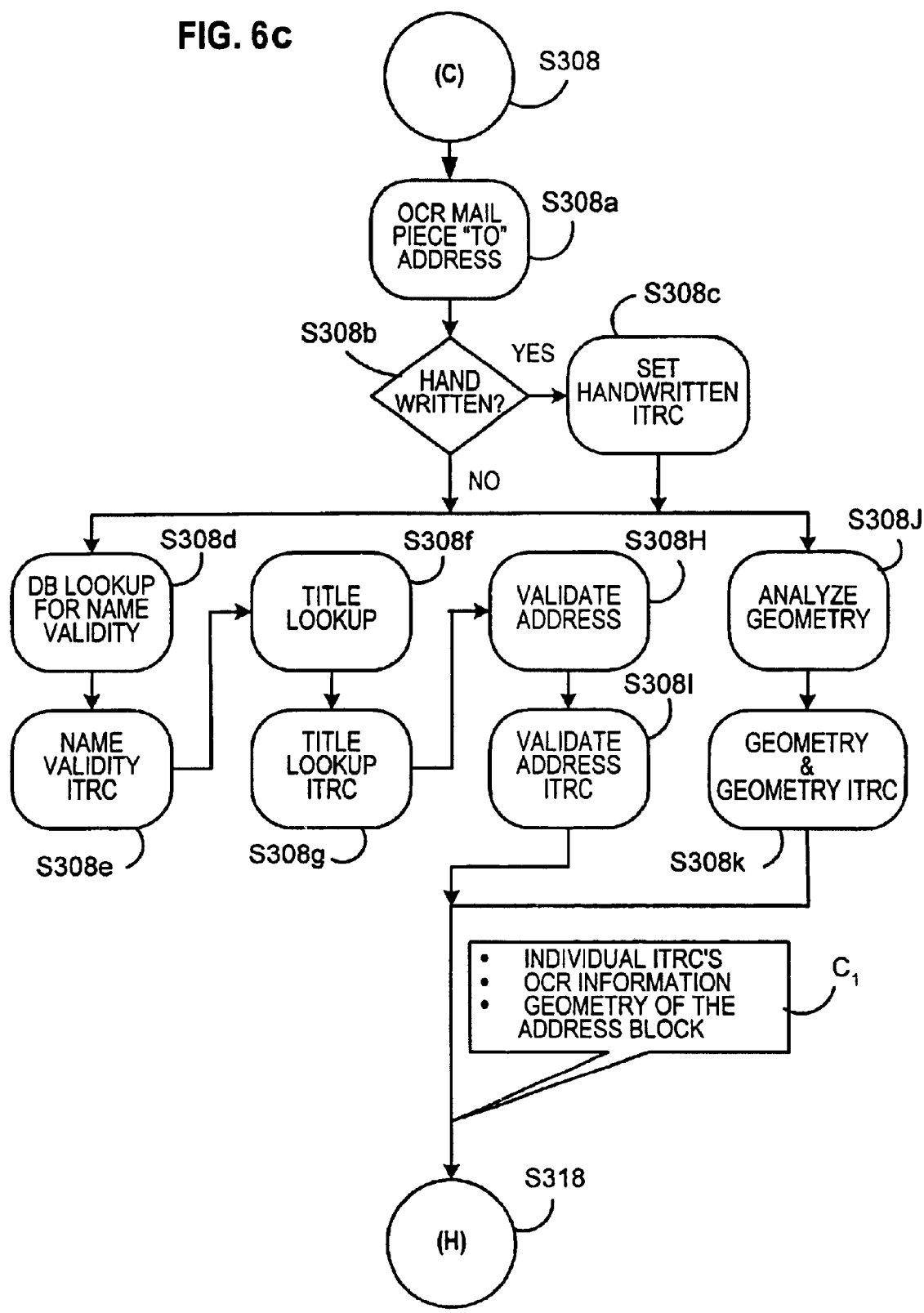

SYSTEM AND METHOD FOR IDENTIFYING POTENTIALLY LIFE HARMING MAILPIECES IN AN INCOMING MAIL STREAM

FIELD OF THE INVENTION

The invention disclosed herein relates generally to automated mail sorting and more particularly, a system and method that identifies potentially life harming mailpieces.

BACKGROUND OF THE INVENTION

The processing and handling of mailpieces consumes an enormous amount of human and financial resources, particularly if the processing of the mailpieces is done manually. The processing and handling of mailpieces not only takes place at the Postal Service, but also occurs at each and every business or other site where communication via the mail delivery system is utilized. That is, various pieces of mail generated by a plurality of departments and individuals within a company need to be addressed, collected, sorted and franked as part of the outgoing mail process. Additionally, incoming mail needs to be collected and sorted efficiently to ensure that it gets to the addressee (i.e. employee or department) in a minimal amount of time. Since much of, the documentation and information being conveyed through the mail system is critical in nature relative to the success of a business, it is imperative that the processing and handling of both the incoming and outgoing mailpieces be done efficiently and reliably so as not to negatively impact the functioning of the business.

Various services are used in the United States and other countries for delivery of mail (incoming mail) to individuals and businesses to recipients to whom the sender does not want to deliver personally. These services include, for example, the United States Postal Service (USPS) and other courier services, e.g., Federal Express®, Airborne®, United Parcel Service,® DHL®, etc., hereinafter called "carriers". Unfortunately, sometimes the delivered materials may be illegal and/or hazardous to the health of the recipient and to the party who is delivering the goods, e.g., life-harming. Examples of life-harming materials are explosives; gun powder; blasting material; bombs; detonators; smokeless powder; radioactive materials; ammunition; atomic weapons; chemical compounds or any mechanical mixture containing any oxidizing and combustible units, or other ingredients in such proportions, quantities, or packing that ignite by fire, friction, concussion, percussion or detonation of any part thereof which may and is intended to cause an explosion; poisons; carcinogenic materials; caustic chemicals; hallucinogenic substances; illegal materials; drugs that are illegal to sell and/or dispense; and substances which, because of their toxicity, magnification or concentration within biological chains, present a threat to biological life when exposed to the environment, etc.

Soon after the Sept. 11, 2001, terrorist attack on the United States, someone and/or a group of people, has been adding harmful biological agents to the mail. The addition of harmful biological agents to the mail submitted to the USPS has caused the death of some people and necessitated the closure of some post offices and other government office buildings and has caused delays in the sortation and delivery of mail including the delivery of incoming mail to businesses. Individuals who receive and handle mail are encouraged to use safety precautions such as: washing their hands thoroughly with soap and water after handling mailpieces; avoiding shaking mailpieces; avoiding bumping or sniffing mailpieces; and avoiding handling of mailpieces suspected of contamination. These measures can be impractical when the volume of mail such as the incoming mail at a business is large. Thus, there is an urgent need to exclude or detect life-harming materials that are included in the mail in such a way that the delivery of the mail is efficient, reliable and safe and thus does not to negatively impact the functioning of the business.

Various automated mail handling machines have been developed for processing incoming mail (removing individual pieces of mail from a stack and performing subsequent actions on each individual piece of mail). Generally, the mail handling machines separate individual mailpieces from a stack, read the mailpieces using an optical character recognition (OCR) system and compare the read information to an addressee database in order to determine the appropriate destination points for delivery of the mailpieces. Previously, if a determination could not be made by the incoming mail handling machine as to the addressee, a video image of the mailpiece was viewed by an operator and in the case where the addressee image was readable by the operator, addressee information was keyed into the system and associated with an identification number for the mailpiece. The previously rejected mailpieces are then resorted by reading the identification information which can be printed on the mail during the first sort. The identification information is linked with the addressee information manually keyed in by the operator during the reject processing/video coding sequence and is used to sort the mailpiece to the proper destination bin. Video processing of mailpieces has been performed at on-site video coding terminals or off-site video coding facilities where the video image is transmitted for determination of addressee by an operator. The information is then transferred back to the sorting apparatus. These automated mail sorting apparatus do not contain the ability to detect and/or sanitize mailpieces suspected of containing life harming agents.

Thus, there is an urgent need to exclude or detect life-harming materials that are included in the mail in such a way that the delivery of the mail is efficient, reliable and safe and thus does not negatively impact the functioning of the business. Thus one of the problems of the prior art is that a system is not available for processing incoming mail and detecting and/or sanitizing mailpieces suspected of containing life harming agents. Therefore, a system and method of processing incoming mail is needed which integrates, prediction of harmful content, detection and/or sanitization with the mailpiece processing so as to help deter delays in incoming mail delivery caused by the presence or suspected presence of life harming material and/or to detect and/or sanitize the mail so as to protect the intended recipients from harm.

SUMMARY OF THE INVENTION

This invention overcomes the disadvantages of the prior art by providing a system and method for processing incoming mail that identifies potentially life harming mailpieces so as to help deter delays in incoming mail delivery caused by the presence of life harming material and to protect the intended recipients from harm. This in turn affords for less delays in mailpiece processing.

The present invention is directed, in general to automated mailpiece sorting apparatus and more particularly, a system and method that identifies potentially life harming mailpieces. The system generally comprises a mailpiece sorting apparatus which includes a feeder, an optical character recognition (OCR) system for reading address information, a scanner, a scale, a scale, appropriate thickness and length measurement sensors are mounted in the apparatus along the path of the mailpiece, a compartments or bins for receiving sorted mailpieces, one or more databases, microprocessor based control system, a document scanner and email functionality. The system and method captures and analyzes mailpiece metrics. The metrics are incorporated into a decision making process as to how the mailpiece should be sorted. The system and method identifies potentially life harming mailpieces with mailpiece processing so as to help deter delays in incoming mail delivery caused by the presence of life harming material in mailpieces and helps to protect the intended recipients from harm.

An advantage of the method of the present invention is that it provides a system and method for identifying potentially life harming mailpieces in an incoming mail stream. Another additional advantage of the present invention is that the negative impact of delayed mail delivery is reduced. Other advantages of the invention will in part be obvious and will in part be apparent from the specification. The aforementioned advantages are illustrative of the advantages of the various embodiments of the present invention.

DESCRIPTION OF THE DRAWINGS

The above and other objects and advantages of the present invention will be apparent upon consideration of the following detailed description, taken in conjunction with accompanying drawings, in which like reference characters refer to like parts throughout, and in which:

FIGS. 6a–i illustrates the details of steps (A) through (J) of the method of FIG. 5b.

DETAILED DESCRIPTION OF THE PRESENT INVENTION

Figure 1A:
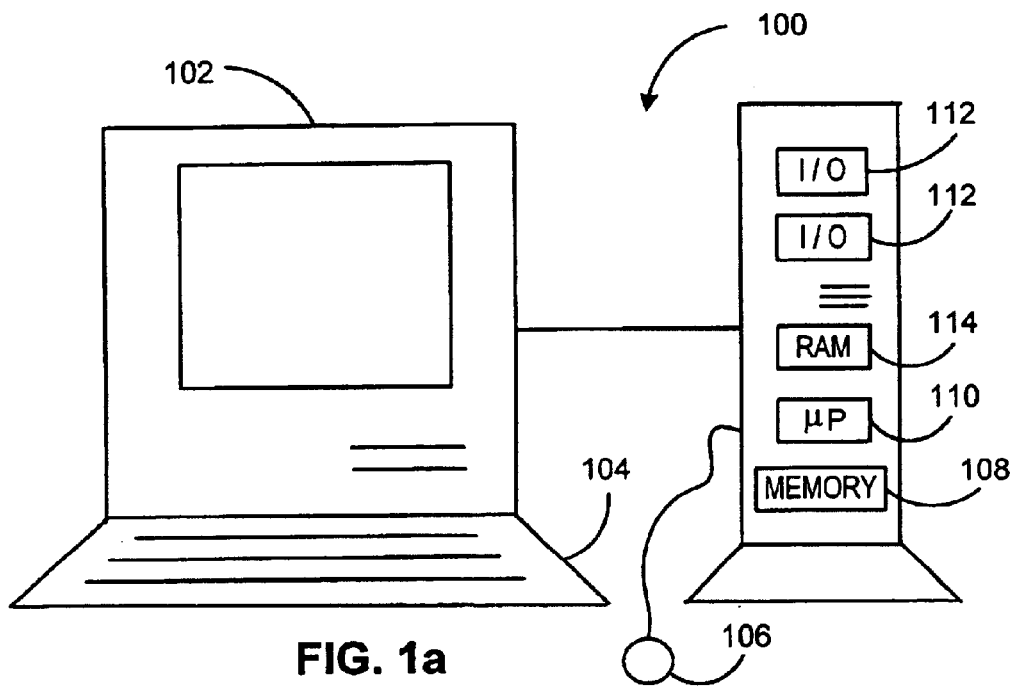
FIG. 1a is a block diagram that illustrates a computer system with which an embodiment of the invention may be implemented or controlled.

In describing the present invention, reference will be made herein to FIGS. 1–6 of the drawings in which like numerals refer to like features of the invention. Features of the invention are not necessarily shown to scale in the drawings.

Acronyms & Abbreviations

The following is a list of acronyms and abbreviations that are used when describing the system and method of the present invention:

| ABBREVIATION | MEANING |
| --- | --- |
| ITRC | Input To Reference Correlation (indicator) |
| SMCL | Safe Mailpiece Confidence Level |
| MDAP | Mailpiece Data Analysis Packet |

Automated Mailpiece Sorting Apparatus Overview

FIG. 1a is a block diagram that illustrates a computer system 100 with which an embodiment of the invention may be implemented. Computer system 100 may be a personal computer which is used generically and refers to present and future microprocessing systems with at least one processor operatively coupled to user interface means, such as a display 102 and keyboard 104, and/or a cursor control, such as a mouse or a trackball 106, and storage media 108. The personal computer 100 may be a workstation that is accessible by more than one user. The personal computer 100 also includes a conventional processor 110, such as a Pentium® microprocessor manufactured by Intel, and conventional memory devices such as hard drive 108, floppy drive(s) 112, and memory 114.

Figure 1B:
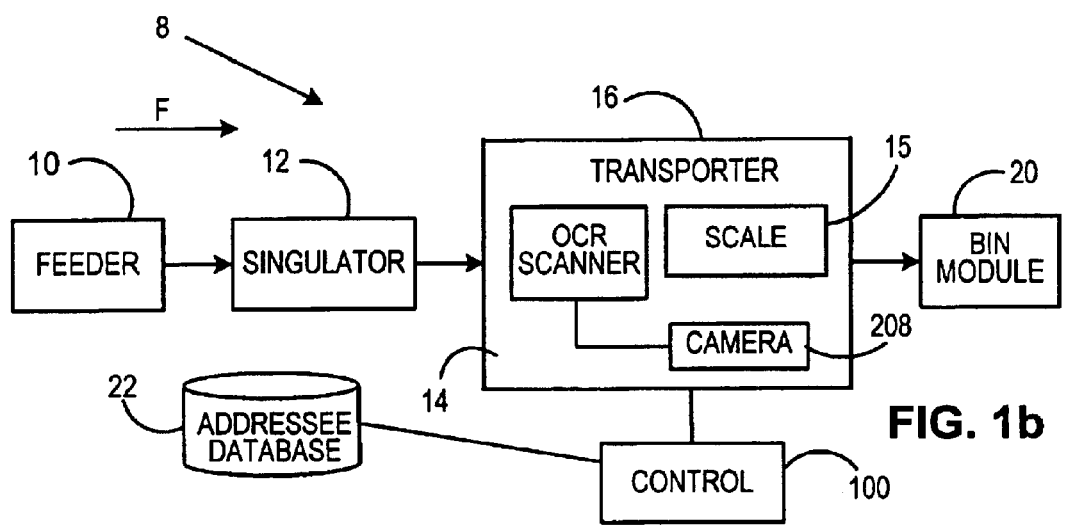
FIG. 1b illustrates the connection of the computer system to a mail sorting apparatus.

The computer system 100 can be connected to a sorting apparatus 8 as illustrated in FIG. 1b. The mailpiece sorting apparatus 8 may generally comprise a feeder 10, a line scan camera 14 (and optical character recognition (OCR) software, not shown), a scale 15 for obtaining mailpiece metrics, a mailpiece transporter 16, a bin module 20 (shown in FIG. 1c) with compartments or bins 18 for receiving sorted mailpieces 30 and a control system 100 which may be the microprocessor based personal computer system 100 described above. The computer system 100 includes appropriate memory devices 108, 114 for storage of information such as an address database 22. One of ordinary skill in the art would be familiar with the general components of the mail sorting apparatus 8.

The feeder 10 of mailpiece sorting apparatus 8 is designed to feed mailpieces of varying sizes, thicknesses and finishes and therefore, can singulate and feed variously configured incoming mailpieces including, for example, envelopes of various sizes, mailpieces up to ¾ inches thick, magazines, and variously configured small packages. The feeder's capability to handle such various mailpieces make it well suited for the present invention because of the need to singulate and sort mail which is of various sizes, thicknesses and finishes prior to additional processing. Such mailpieces are difficult to feed with a typical feeding apparatus.

Exemplary aspects of the feeder 10 of the system of the present invention are disclosed in the following: U.S. Pat. No. 5,971,391, issued Oct. 26, 1999 to Salomon et al. titled NUDGER FOR A MAIL HANDLING SYSTEM; U.S. Pat. No. 6,003,857, issued Dec. 21, 1999 to Salomon et al. titled SINGULATING APPARATUS FOR A MAIL HANDLING SYSTEM, U.S. Pat. No. 6,135,441 issued Oct. 24, 2000 to Belec et al. titled TWO STAGE DOCUMENT SINGULATING APPARATUS FOR A MAIL HANDLING SYSTEM; U.S. Pat. No. 6,217,020 issued Apr. 17, 2001 to Supron et al. titled METHOD AND APPARATUS FOR DETECTING PROPER MAILPIECE POSITION FOR FEEDING; and U.S. Pat. No. 6,328,300 issued Dec. 11, 2001 to Stefan et al.

titled ALIGNER MECHANISM FOR A MAIL HANDLING SYSTEM and assigned to the assignee of the present invention and incorporated by reference herein.

The mailpiece sorting apparatus 8 and the OCR software may be used to determine the addressee of the mailpiece 30 or other information on the face of the mailpiece 30. The reading of various information may be performed with the assistance of intelligent character recognition (ICR) or imaging character recognition (OCR/IC) which may be part of the above mentioned OCR software and can read the various fields on the mailpiece 30.

Suspect/Harmful Mailpieces

Figure 2A:
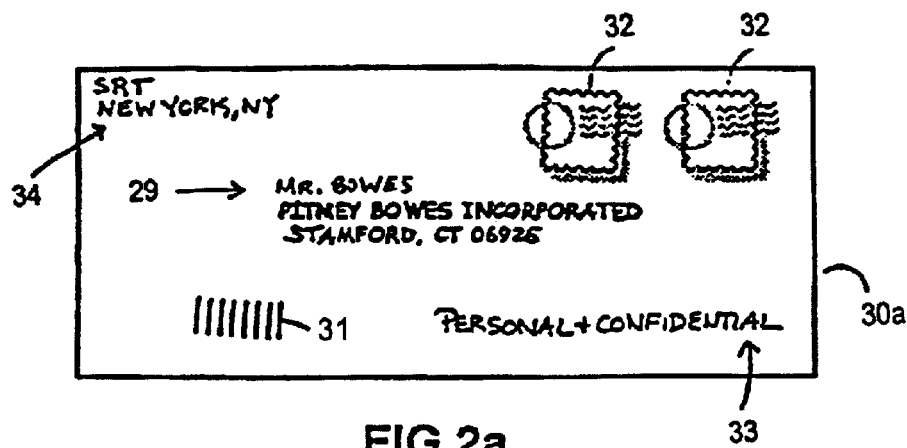
FIGS. 2a–b illustrate exemplary suspect mailpieces.
Figure 2B:
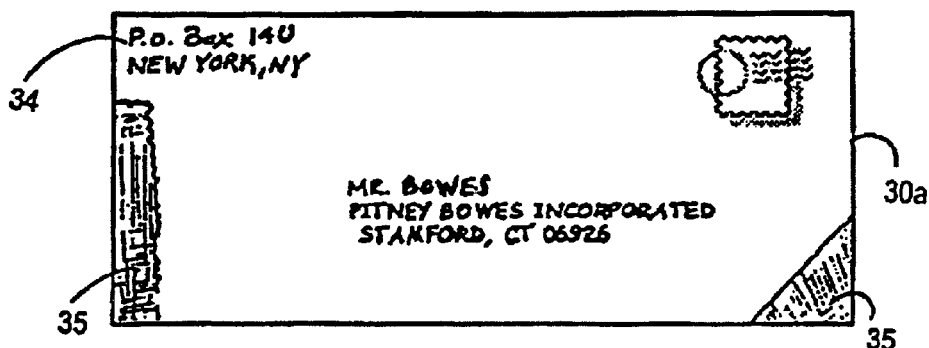

FIGS. 2a–d illustrate various examples of suspect mail 30a and trusted mail 30b. FIGS. 2a–b represent possibly suspect and/or harmful mailpieces. The Postmaster General of the United States has sent a message to postal customers across the country with criteria for suspect mailpieces. This United States Postal Service (USPS) criteria includes: 1) mail that is unexpected or from someone that you do not know; 2) mail that is addressed to someone no longer at your address; 3) mail that is handwritten and has no return address or bears a return address that cannot be confirmed; 4) mail that is lopsided or lumpy in appearance; 5) mail that is sealed with excessive amounts of tape; 6) mail that is marked with restrictive endorsements such as "personal" or "confidential"; and/or 7) mail that has excessive postage. The mailpiece of FIG. 2a is a possible suspect mailpiece because it has excessive postage 32 (i.e. multiple stamps), is addressed to an addressee 29 no longer at the address, bears the marking PERSONAL & CONFIDENTIAL 33 and has an unconfirmable return address 34 of SRT NEW YORK, NY. The mailpieces of FIG. 2b is a possible suspect mailpiece because it bears an unconfirmable return address 34 of PO BOX 14U, NEW YORK, N.Y.; is addressed to an addressee 29 no longer at the address, and is sealed with excessive amounts of tape 35.

In addition to the USPS criteria, Pitney Bowes, a company providing, leading-edge global, integrated mail and document management solutions for organizations of all sizes, and the assignee of the present invention, provides criteria at its web site www.pb.com. The criteria for suspect mail includes: 1) packages with excessive postage, using postage stamps as opposed to meter indicia; 2) addresses which are poorly typed or handwritten, and have misspellings; 3) packages which have oily stains, crystallization on wrapper or strange odors; 4) mail containing no return address or a return address not consistent with postmark; 5) mail which is exceptionally large or is a lopsided package; 6) a package which is rigid, bulky or discolored; 7) a package which displays evidence of electrical wire or tin foil; 8) a package which makes a sloshing sounds or appear to contain liquid; and 9) packages with excessive wrapping materials, such as masking tape, strapping tape, or string. Other organizations, such as law enforcement agencies or investigation authorities are also providing criteria for determining suspect mail including the Federal Bureau of Investigations (FBI).

Figure 2C:
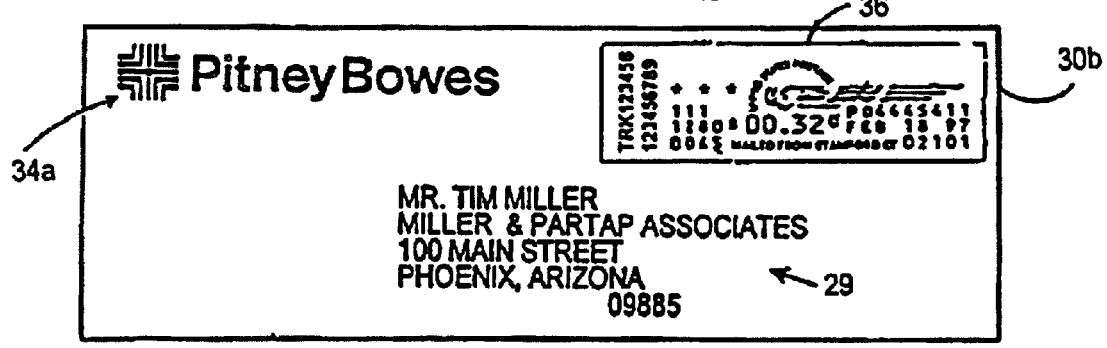
FIGS. 2c–d illustrate exemplary trusted mailpieces which include Pitney Bowes postage indicia that includes origin information.
Figure 2D:
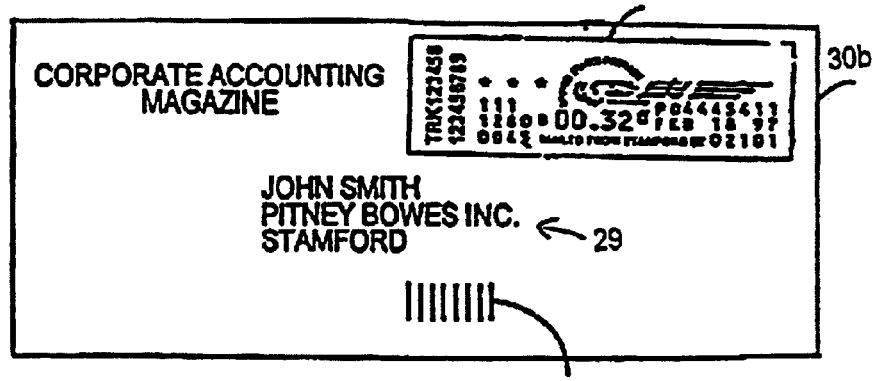

FIGS. 2c–d illustrate mail that is more trusted than those of FIGS. 2a–b. The mail 30b is trusted because postage (indicia 36) has been fixed to the mailpiece using a postage meter such as a Pitney Bowes electronic postage meter. Each Pitney Bowes postage meter imprint, includes, a tracking number that identifies the original point of mailing so recipients of mail can feel more comfortable receiving the mail since each piece has a unique fingerprint. Pitney Bowes Galaxy digital postage meters (not shown) can print indicia which includes various other information such as encrypted information in the indicia 36 of FIGS. 2c–d.

Figure 3:
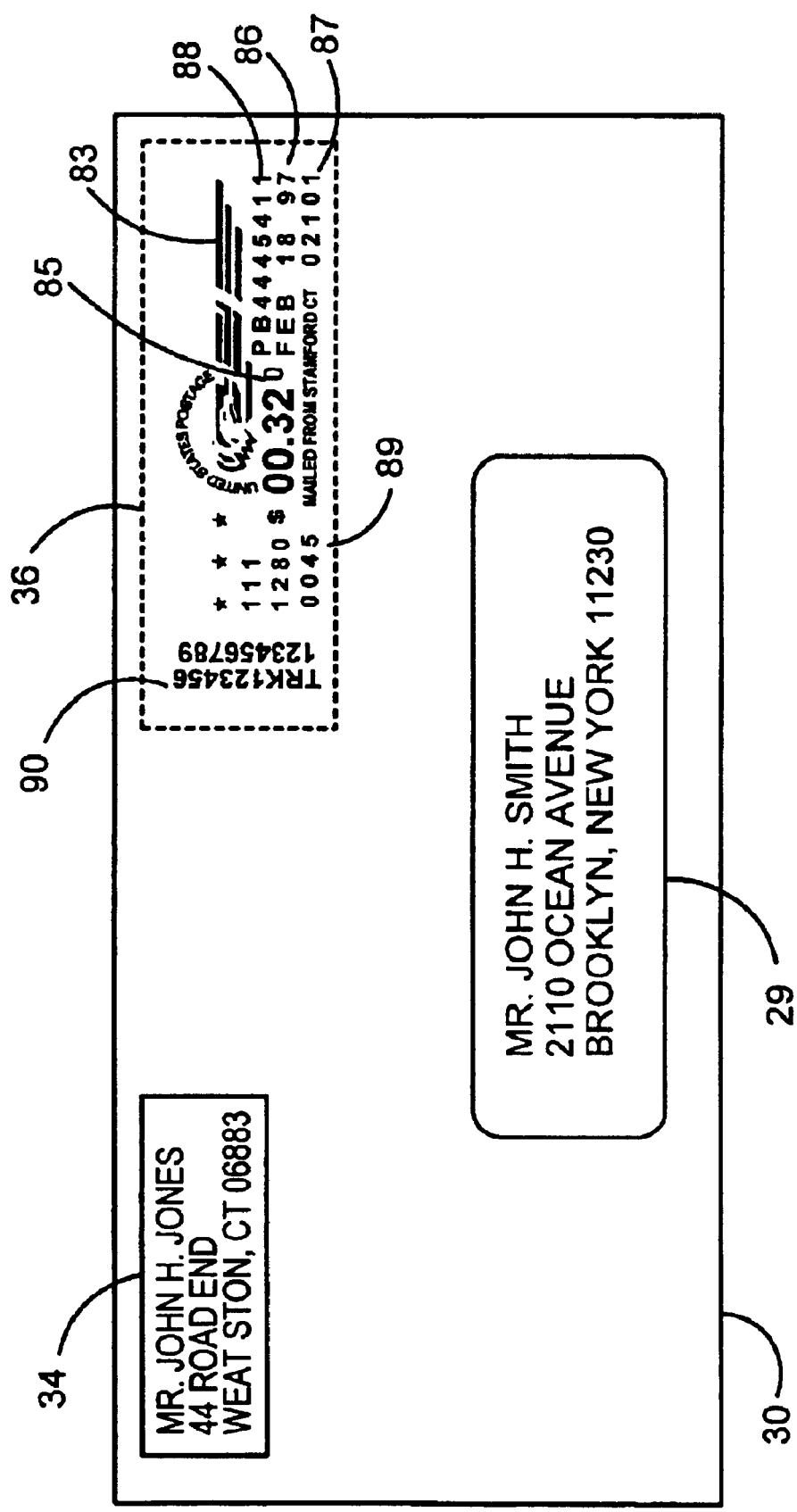
FIG. 3 is a drawing of a mailpiece containing a postal indicia that was affixed by an electronic meter.

FIG. 3 is a drawing of a mailpiece containing a postal indicia that was affixed by an electronic meter. Mailpiece 30 has a recipient address field 29 and a sender address field 8. A postal indicia 36 is affixed to mailpiece 30. Indicia 36 contains a dollar amount 85; the date 86 that postal indicia 36 was affixed to mailpiece 30; the place 87 that mailpiece 30 was mailed; the postal meter serial number 88; an eagle 83; a security code 89; and, a tracking number 7. Security code 89 and tracking number 90 are unique numbers that are derived from address field 29 and information contained in the postage meter that affixed indicia 36. The manner in which security code 89 and tracking number 90 are obtained is disclosed in the Sansone, et al. U.S. Pat. No. 4,831,555 titled UNSECURED POSTAGE APPLYING SYSTEM, assigned to the assignee of the present invention and herein incorporated by reference.

Figure 4:
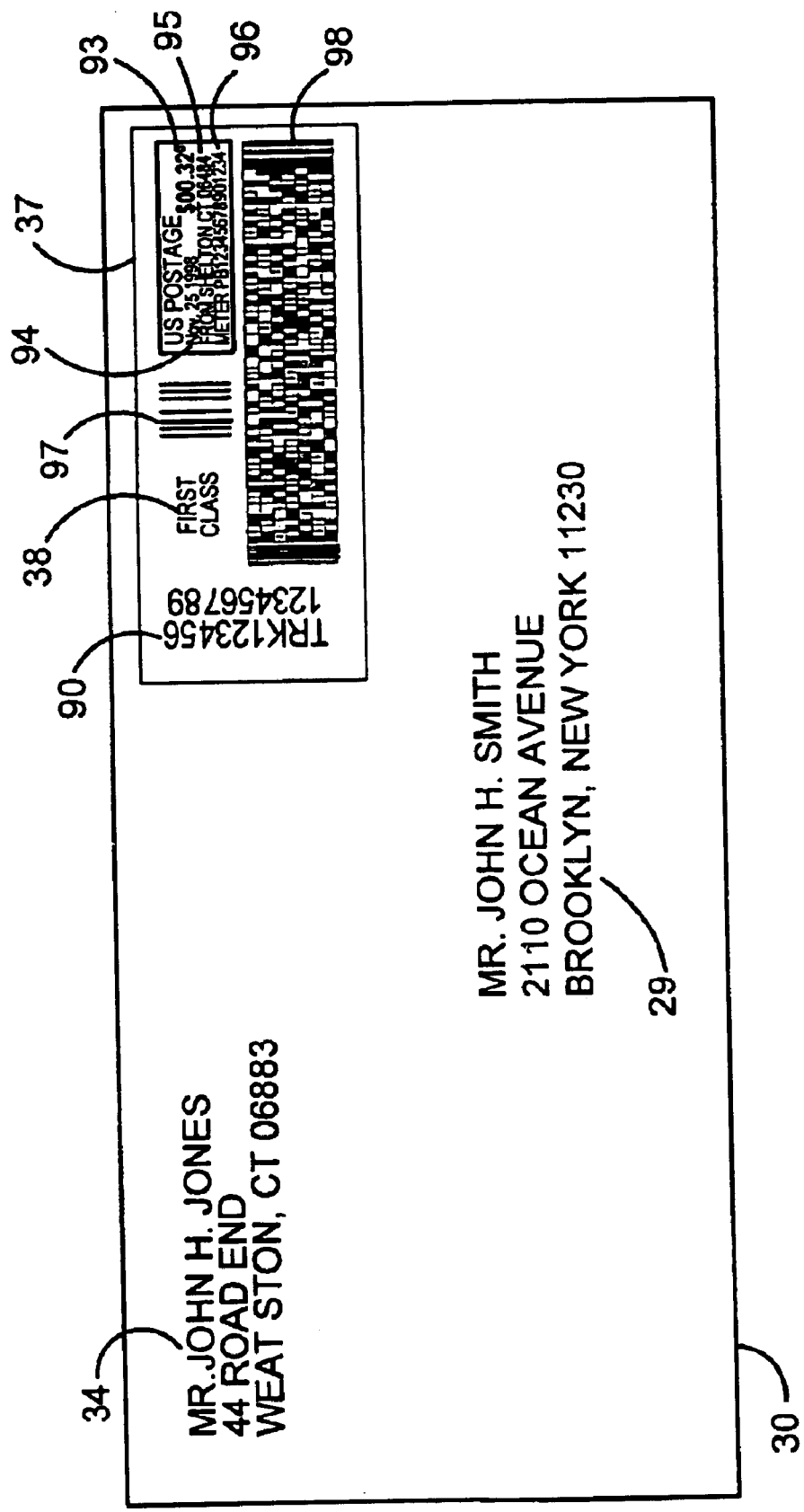
FIG. 4 is a drawing of a mailpiece containing an Information-Based Indicia.

FIG. 4 is a drawing of a mailpiece 30 containing a indicia 37. Mailpiece 30 has a recipient address field 29 and a sender address field 8. Mailpiece 30 contains USPS Information—Based Indicia (IBI) 37. The United States Postal Service Engineering Center has published a notice of proposed specification that describes a Information Based Indicia. The postal indicia 37 contains a dollar amount 93, the date 94, that the postal indicia was affixed to mailpiece 30, the place 95 that mailpiece 30 was mailed, the postal security device serial number 96, a FIM code 97; a 2D encrypted bar code 98; and a tracking number 7. Serial number 96 may be derived from bar code 98 or be equal to bar code 98. Bar code 98 is a unique number that is derived from address field 29 and information contained in the postal security device that affixed IBI 37. The manner in which information contained in bar code 98 is obtained is disclosed in the Sansone, et al. U.S. Pat. No. 4,831,555 titled UNSECURED POSTAGE APPLYING SYSTEM, assigned to the assignee of the present invention and herein incorporated by reference. Mailpiece 30 also contains an indication 38 of the class of mailpiece 30.

In addition to offering criteria for suspect mailpieces, Pitney Bowes offers guide lines for mail security practices so that companies can establish trust with their recipients. The guidelines include metering your mail such as with the Pitney Bowes indicia 36, using a clear identifiable return address such as a printed logo 34a, using postcards, avoiding sending samples, using tamper resistant seals, and using tape printed with your company name to seal packages.

System for Identifying Potentially Life Harming Mailpieces in an Incoming Mail Stream FIG. 5 illustrates an embodiment of the mailpiece analysis system architecture 200 of the present invention for identifying potentially life harming mailpieces in an incoming mail stream. The system architecture comprises a system configuration application 202, one or more database for storage of data such as, for example, configuration parameters, task list(s) and rule(s), a rule processor and analysis modules. The database 204 provides data to the system configuration application 202 and the rule processor 206. The system 200 further comprises a camera 208, a scale 210, and a processor 212. The processor uses the data input from data obtaining devices such as, for example, the camera 208 and the scale 210 to create a Mailpiece Data Analysis Packet (MDAP) 214. The rule processor 206 uses data from database(s) 204 in addition to analysis modules 216 to process mailpiece data analysis packet(s) 214 and obtain results 218. It should be noted that while FIG. 5 depicts four analysis modules, any number of analysis modules may be implemented as may be determined by one of ordinary skill in the art using factors such as the types of analysis that are desired to be performed. The modules can be software programs or subprograms that perform calculations and logical evaluations of the MDAP 214, data 204 and rules 204. The results are passed to the machine control 220 that controls the mailpiece sorting apparatus and various components connected thereto. The machine control 220 also provides instructions to processor 212. The machine control 200 and processor 212 can be part of control 100 depicted in FIG. 1b.

Method for Identifying Potentially Life Harming Mailpieces in an Incoming Mail Stream FIGS. 6a–f illustrates an embodiment of the method of the present invention for identifying potentially life harming mailpieces in an incoming mail stream. The figures represent one or more flow charts of the embodiment of the method of the present invention. Generally, the steps of the flow chart are depicted with squares or rectangled to indicate a physical process and rounded squares or rounded rectangles to process steps. However, this representation is not meant to be limiting to the nature of the steps depicted in the flow chart. Also, other flow chart shapes are used such as query indicators (diamonds), connectors (circles) and explanation boxes (caption type boxes). There are numerous branches to the flow chart of FIGS. 6a-f; the branches are labeled correspondingly using indicators (A), (B), (C), (D), (E), (F), (G), (H), (I), (J), (K), (L), (M), (N), (O) and (P) which may also be referred to as subsystems. These indicators can be found in connectors and also corresponding to steps of FIG. 6a for with further details are provided in additional flow chart pages of FIGS. 6b–f.

Figure 5A:
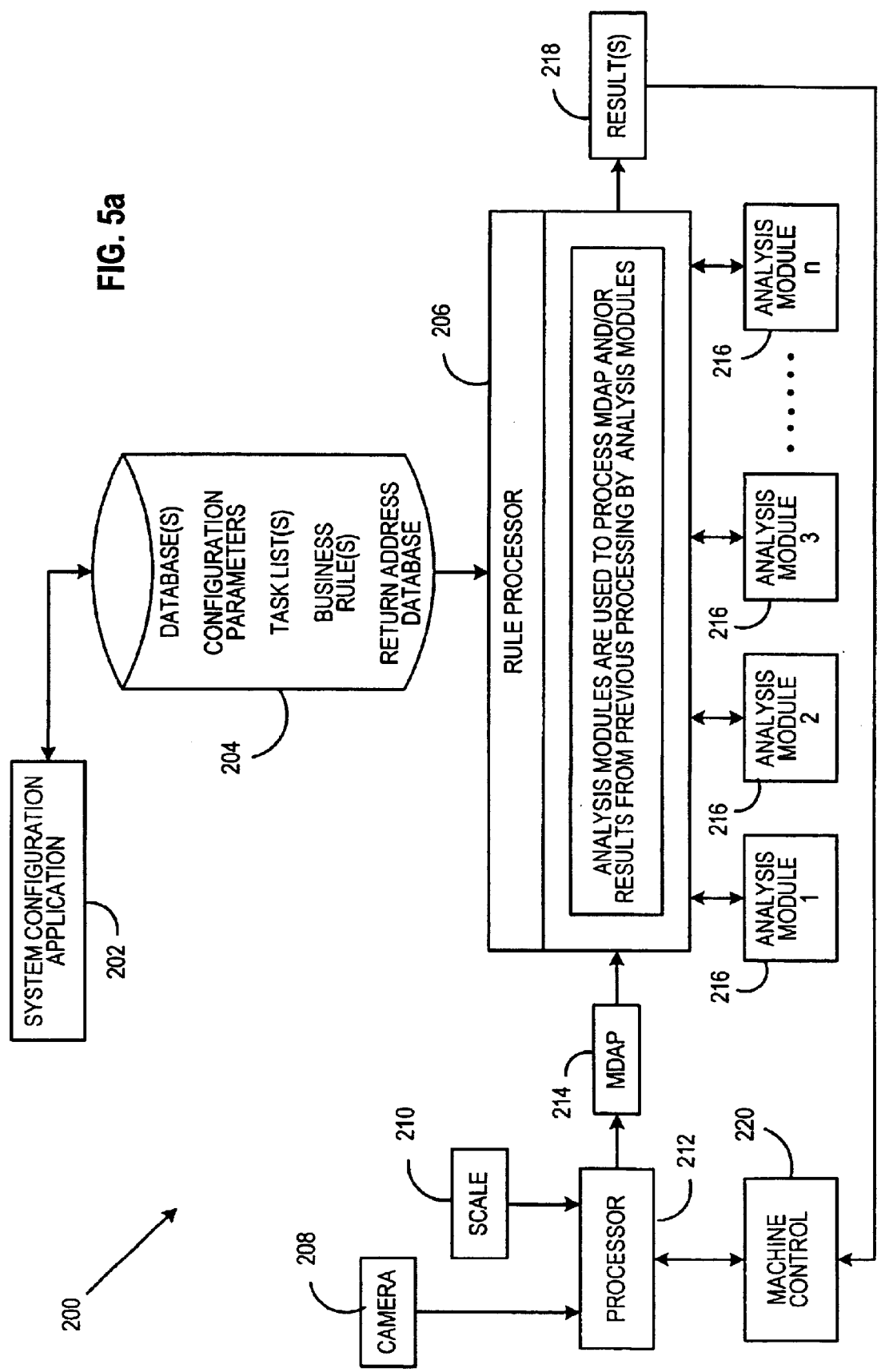
FIG. 5a illustrates an embodiment of the mailpiece analysis system architecture of the present invention for identifying potentially life harming mailpieces in an incoming mail stream.
Figure 5B:
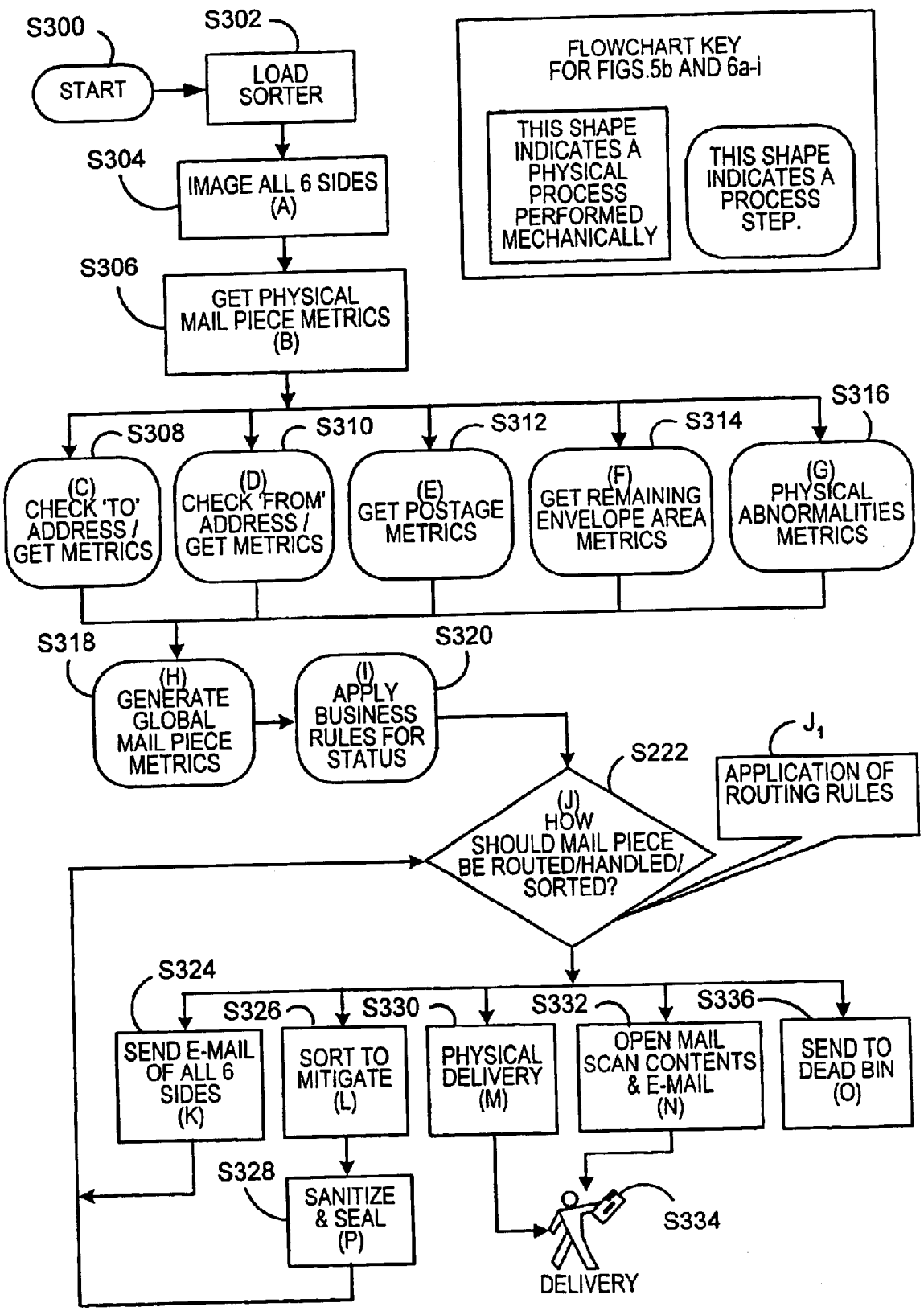
FIGS. 5b illustrates an embodiment of the method of the present invention for identifying potentially life harming mailpieces in an incoming mail stream.
Figure 6A:
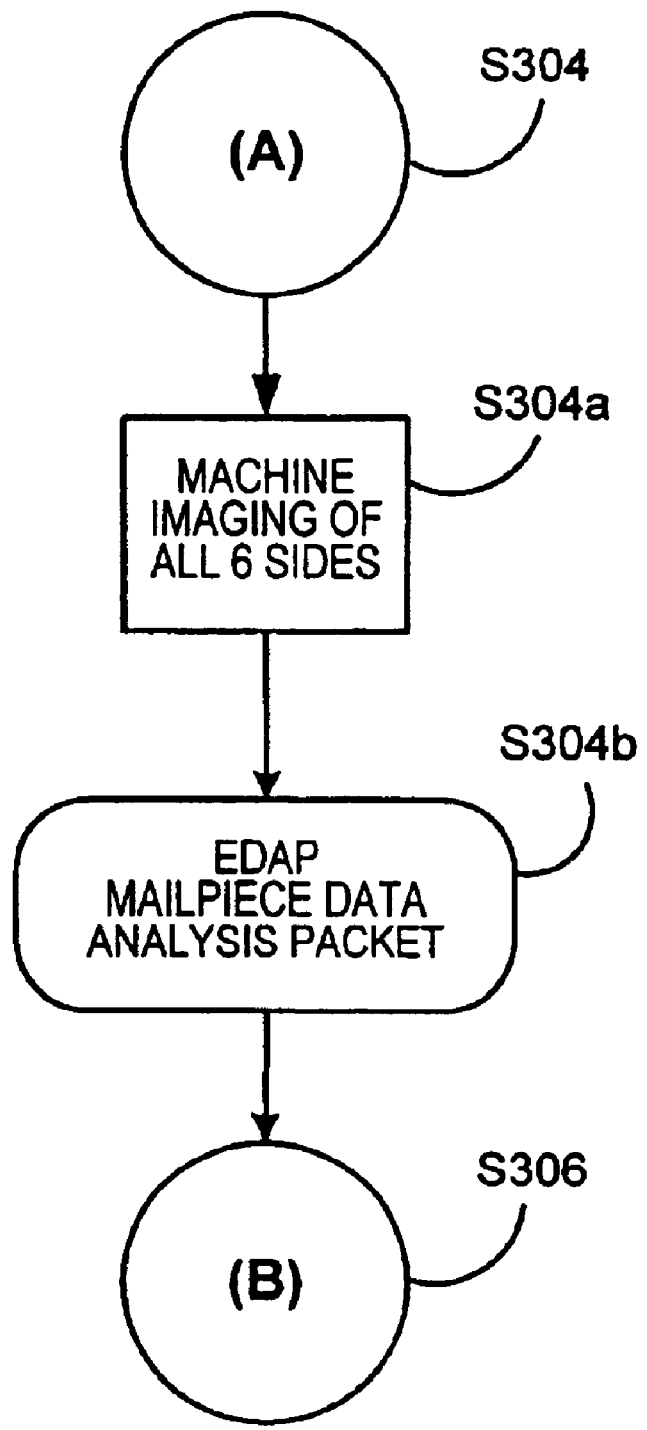

Referring to the flow chart of FIG. 5b, at step S300 the method begins. At step S302 a stack of mailpieces (not shown) is placed on the feeder 10 of the mailpiece sorting apparatus 8 (and interconnecting system 200 of FIG. 5) and the feeder 10 is set to auto feed. The mailpieces 30 are moved along the feed path F and a leading mailpiece is obtained from the singulating device. At step S304, also known as (A) Imaging, steps are performed as is detailed in the flow chart of FIG. 6a. Generally, at step S304, the camera 208 captures an images of each of the sides of the mailpiece (i.e. for an envelope an image of each of six sides of the envelope is captured). Next, at step S304a shown in FIG. 6a, a mailpiece data analysis packet is created. At step S306, also known as (B) Weighing, the steps detailed in the flow chart of FIG. 6b are performed. Size, weight, length, stiffness, and center of gravity information are examples of mailpiece metrics obtained in step S306 and are not meant to be limiting. One or more of these metrics is obtained at step 306. Other metrics as may be determined by one of ordinary skill in the art could also be obtained. At step S306a length, width and depth of the mailpiece are obtained. This data can be obtained through the use of devices such as pivotable rollers with sensors and timers positioned along the feed path F which can measure thickness and length parameters. At step S306b the scale 15 (shown in FIG. 1b) determines the mailpiece weight. At step S306c mailpiece stiffness can be determined. This data can be obtained through the use of devices such as strain gauges positioned along the feed path F which can measure the stiffness of the mailpiece. The stiffness measurement can be performed on the mailpiece to determine whether items or objects other than paper sheets are contained within the mailpiece. At step S306d, the stability of the center of gravity of the mailpiece contents can also be determined. This data can be obtained through the use of devices such as a point fulcrum, plate and vibrating apparatus positioned along the feed path F which can measure the stability of the center of gravity of the mailpiece by determining if the center of gravity has moved from an initial position prior to vibration to a second position after vibration. As is shown by caption $B_1$ of FIG. 6b, mailpiece metrics are the result of steps 306a–d.

In the present embodiment, after obtaining physical data about the mailpiece, logical processes are performed. The order of such steps is not meant to be limited to by this embodiment and can be re-arranged as determined practicable by one of ordinary skill in the art. Steps S308, S310, S312, S314 and S316 individually follow step S308.

At step S308, also known as (C) Addressee (Consignee) Address Analysis, steps are performed as is detailed in the flow chart of FIG. 6c. As part of step S308, the mailpiece images captured at step S304 are analyzed to find the image which contains the addressee (consignee) address. Once the consignee (or "to") address is found, optical character recognition is performed on the address using the OCR system including OCR scanner 14 of FIG. 1b. At step S308b, a query is made as to whether the address is handwritten. If the answer to the query OF STEP S308b is yes, then at step S308c the handwritten Input To Reference Correlation (ITRC) or indicator is set. The ITRC or indicator is a weight, the calculation of which is determined by information stored in a database such as a configuration database or other appropriate database. An example configuration with respect to handwriting would assign weight to various characteristics of handwriting such as hand printed block letters which could have a greater weight than hand printed cursive letters. An ITRC OR INDICATOR for handwritten block letters could be calculated based upon the weight correlated to the characteristic in the configuration database. Following step S308b where the answer is no, and following step S308c are steps S308d–i and S308j–k. At step S308d the addressee name is looked up in an addressee database to determine the validity i.e the addressee address, is compared to an addressee database to obtain a match from the database. The result of the match is a mailpiece metric.

As further illustrated in FIG. 6c, if a valid addressee match is made, further database related processing such as matching the title if it is present in the consignee address and checking for spelling mistakes are also performed and captured as a mailpiece metric. At step S308e, name validity Input To Reference Correlation (ITRC) is determined: At step S308f title lookup (if applicable) is performed. At step S308g title validity Input To Reference Correlation (ITRC) is determined. At step S308h address validity is determined. At step S308i address validity Input To Reference Correlation is determined. In addition to or alternately to steps S308d–i, steps S308j–k are performed. At step S308j mailpiece geometry is analyzed. At step S308k, geometry validity Input to Reference Correlation is determined. The address block geometry processing is performed and the results are captured as metrics. The result of steps S308i and S308k can be, as shown in caption $C_1$, individual Input To Reference Correlations, OCR information and Geometry of the address block. Following steps S308i and S308k is Step (H) or S318 which will be described below in the detailed description of FIG. 6h. In addition to the analysis illustrated handwriting analysis could also be performed.

At step S310, also known as (D) Addressee (Consignee) Address Analysis, analysis is performed as is detailed in the flow chart of FIG. 6b. As part of step S310, the mailpiece images captured at step S304 are analyzed to find the image that contains the addressor (consignor/return/from) address. Once the from address is found, optical character recognition is performed on the address using the OCR system including OCR scanner 14 of FIG. 1b. At step S310b, a query is made as to whether the from address is a valid address. At this step, the return address is compared to return addresses in the database to obtain a match. The result is captured as a mailpiece metric. The return address could also be compared to external databases (not shown) and/or web services (not shown) to identify confidence levels resulting in useful metrics. One example for calculating confidence level for a return address would use the result of several comparisons including external database and web services. The percent match of the return address to each database or service and the number of databases to which the return address is compared could be used to calculate the confidence level. If the answer to the query of step S310b is no, then at step S310c the Input To Reference Correlation (ITRC) is set. Step S310c is followed generally by step S318 or (H) which is detailed in FIG. 6h.

Returning to the query of step S310b, if the answer to the query of step S310b is yes, then at step S310d a query is made as to whether the address is handwritten. If the answer to the query OF STEP S310d is yes, then at step S310e the handwritten Input To Reference Correlation (ITRC) is set. Following step S310d where the answer is no are steps S308f–k and S308l–m. At step S310f the addressee name is looked up in an addressee database to determine the validity i.e the addressee address, is compared to an addressee database to obtain a match from the database. The result of the match is a mailpiece metric.

Figure 6D:
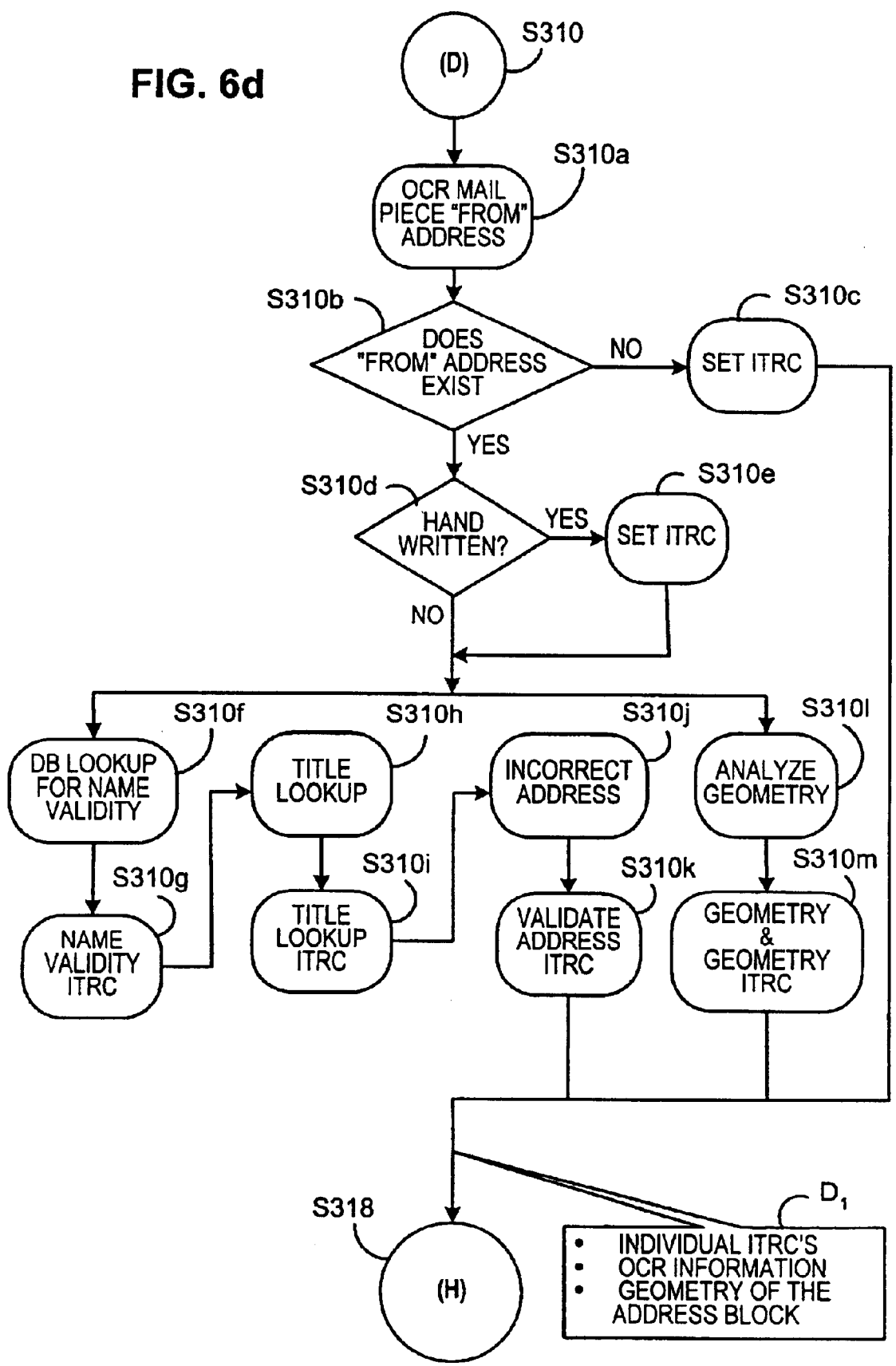

As further illustrated in FIG. 6d, if a valid addressee match is made, further database related processing such as matching the title, if it is present in the consignee address, and checking for spelling mistakes, are also performed and captured as a mailpiece metric. At step S310g, name validity Input To Reference Correlation (ITRC) is determined. At step S310h title lookup (if applicable) is performed. At step S310i title validity Input To Reference Correlation (ITRC) is determined. At step S310l address validity is determined by looking up the address in an address database. At step S310k address validity Input To Reference Correlation (ITRC) is determined. In addition to or alternately to steps S310l–m are performed. At step S310l mailpiece geometry is analyzed. At step S310m, geometry validity Input To Reference Correlation (ITRC) is determined. The address block geometry processing is performed and the results are captured as metrics. The result of steps S310f–k and S310l–m can be, as shown in caption $C_1$, individual Input To Reference Correlations (ITRCs), OCR information and Geometry of the address block. Following steps S310k and S310m is Step (H) or S318 which will be described below in the detailed description of FIG. 6h. In addition to the analysis illustrated handwriting analysis could also be performed.

Figure 6E:
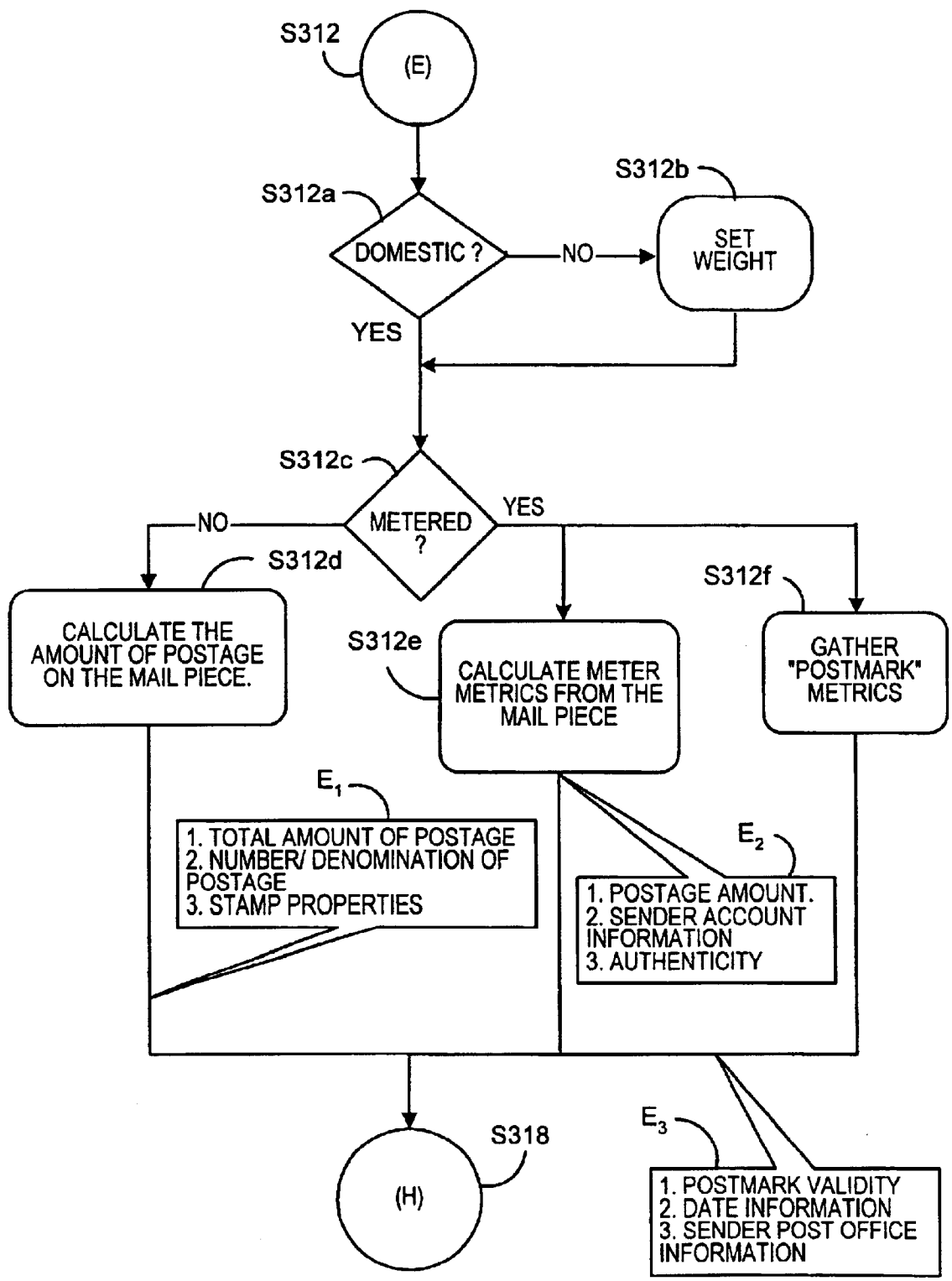

At step S312 also known as (E) Postage Analysis, steps are performed as is detailed in the flow chart of FIG. 6e. As part of step S312, the mailpiece images captured at step S304 are analyzed to find the image that contains the postage. At step S312a a query is made as to whether the postage is domestic or foreign. If the postage is foreign, at step S312b the postage weight is set. As was explained above with respect to handwriting, a similar type of configuration can be set with respect to postage. For example, postage from the North American countries could be given a lower weight (i.e. determined to be safer) than postage from countries outside of North America. This information would be set in the configuration database. Following step S312b and following step S312b and if the answer to the query of step S312a is yes (the postage is domestic), then at step S312c a query is made as to whether the postage is metered i.e. the postage indicia is printed from a Pitney Bowes postage meter (meter indicia 36, 37 are illustrated in FIGS. 3 and 4). If the answer to the query of step S312c is no, then at step S312d the amount of postage on the mailpiece and postage metrics are determined. Postage metrics can include, as illustrated in caption $E_1$, total amount of postage, number and denomination of postage stamps, and stamp properties including, but not limited to, positioning. If the answer to the query of step S312c is yes, then one or both of steps S312e and S312f are performed. At step S312e, meter metrics for the mailpiece are determined. The meter metrics, as illustrated in caption $E_2$, can include information such as postage amount, sender account information and authenticity information. At step S312f postmark metrics are determined. Postmark metrics, as illustrated in caption $E_3$, can include, for example, postmark validity, date information, sender post office information. For all types of postage, the postmark can be a metric. Following steps S312d, S312e and S310f is Step (H) or S318 which will be described below in the detailed description of FIG. 6h.

Figure 6F:
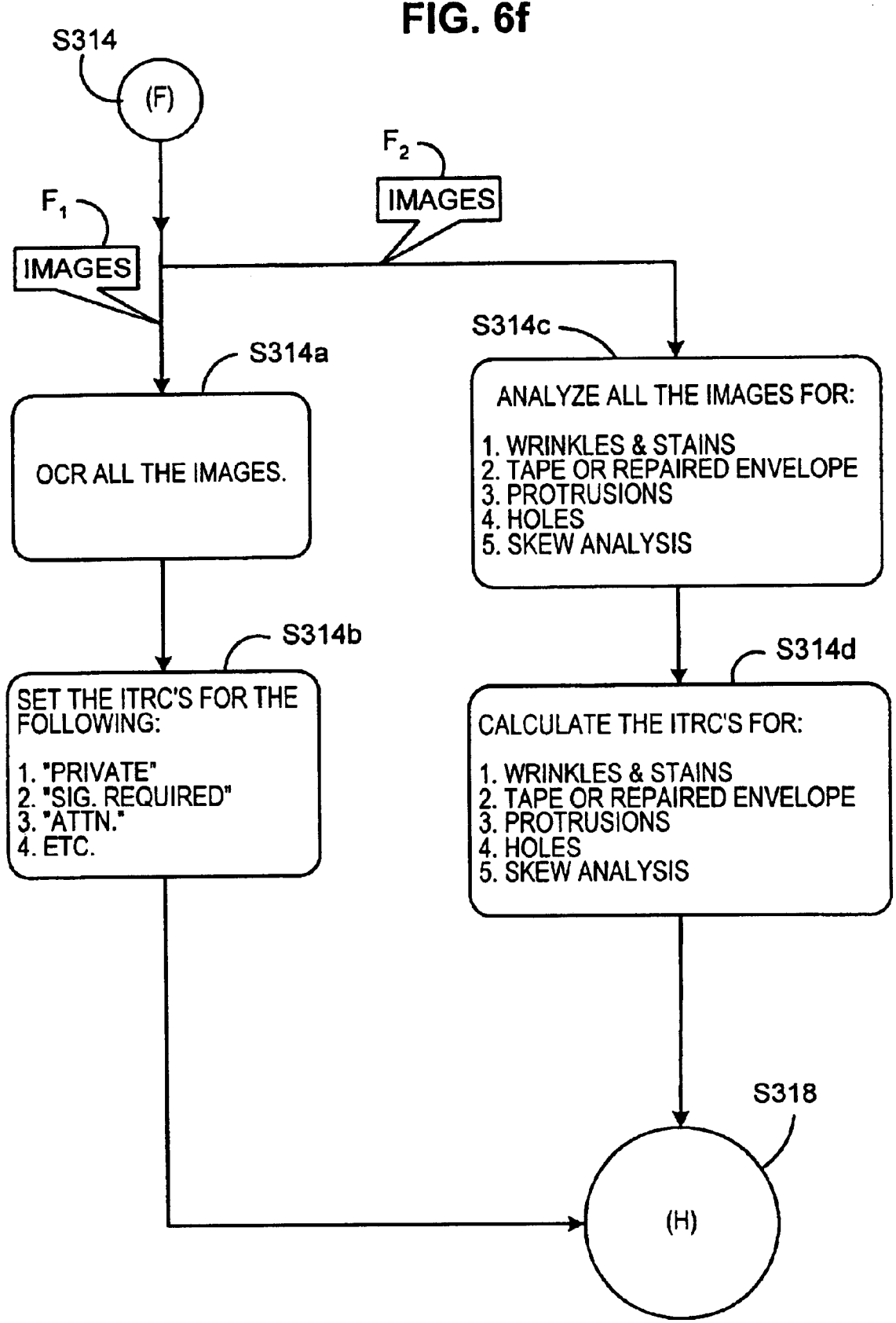

At step S314, also known as (F) Special Mark Analysis, analysis is performed as is detailed in the flow chart of FIG. 6f. As part of step S314, the mailpiece images captured at step S304 are analyzed to determine whether in the image contains special markings. The images as shown by captions $F_1$ and $F_2$ are analyzed or OCR is performed on the images. At step S314a OCR is performed on the images. Then, at step S314b the ITRC for special markings is set. The special markings can include, but are not limited to, PRIVATE, SIGNATURE REQUIRED, ATTENTION, ETC. In addition to steps S314a–b or individually, steps S314c–d are performed. At step S314c the images are analyzed to determine the presence of special markings including, but not limited to, wrinkles and stains, tape or repairs, protrusions, holes and skew. Following step S314c, at step S314d, the ITRC or indicator for special markings determined in step S314c are calculated and set. In steps S314b and S314d, the existence and text of one or more of the marking is captured and stored. Following steps S314b and steps S314d is Step (H) or S318 which ill be described below in the detailed description of FIG. 6h.

Figure 6G:
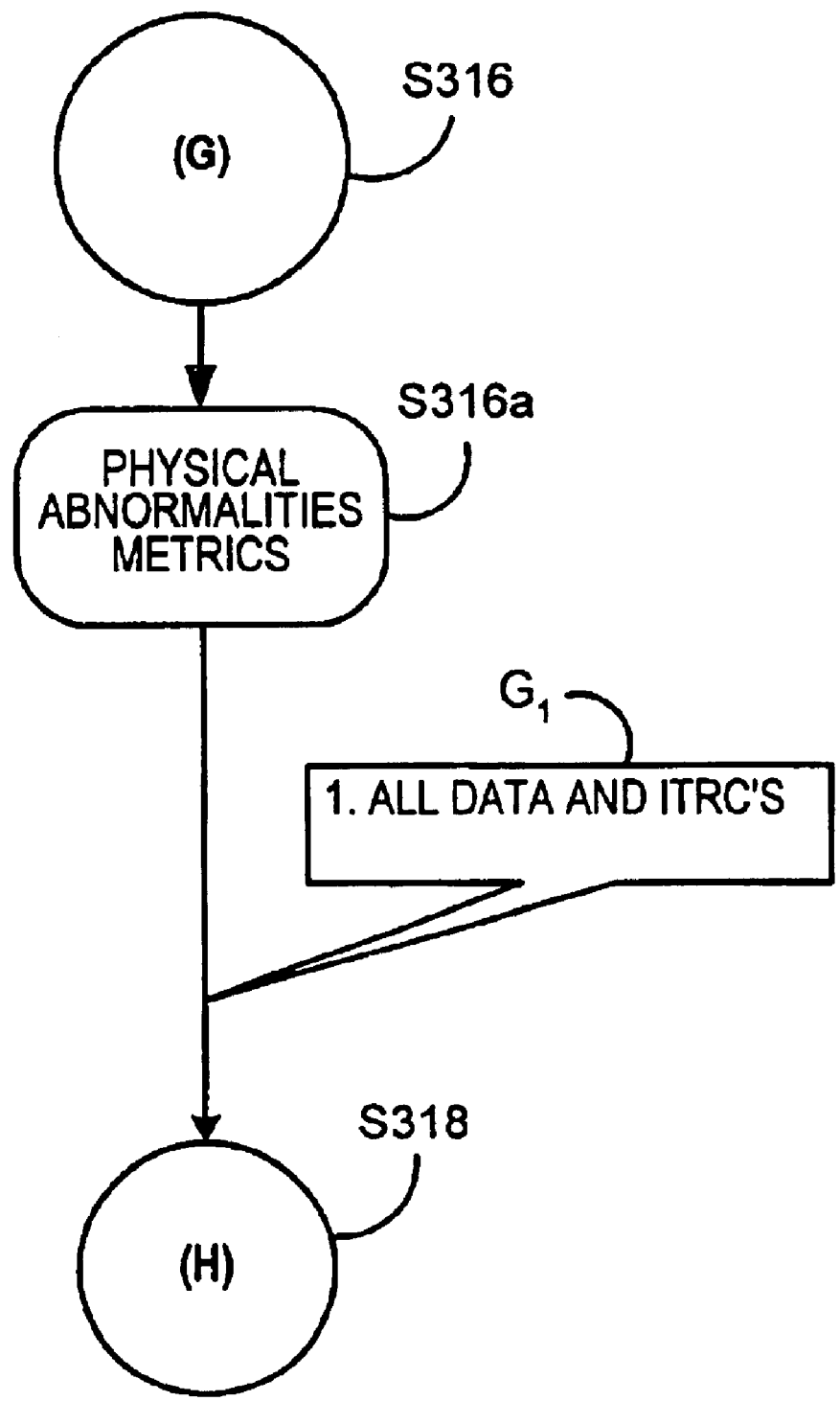
Figure 6H:
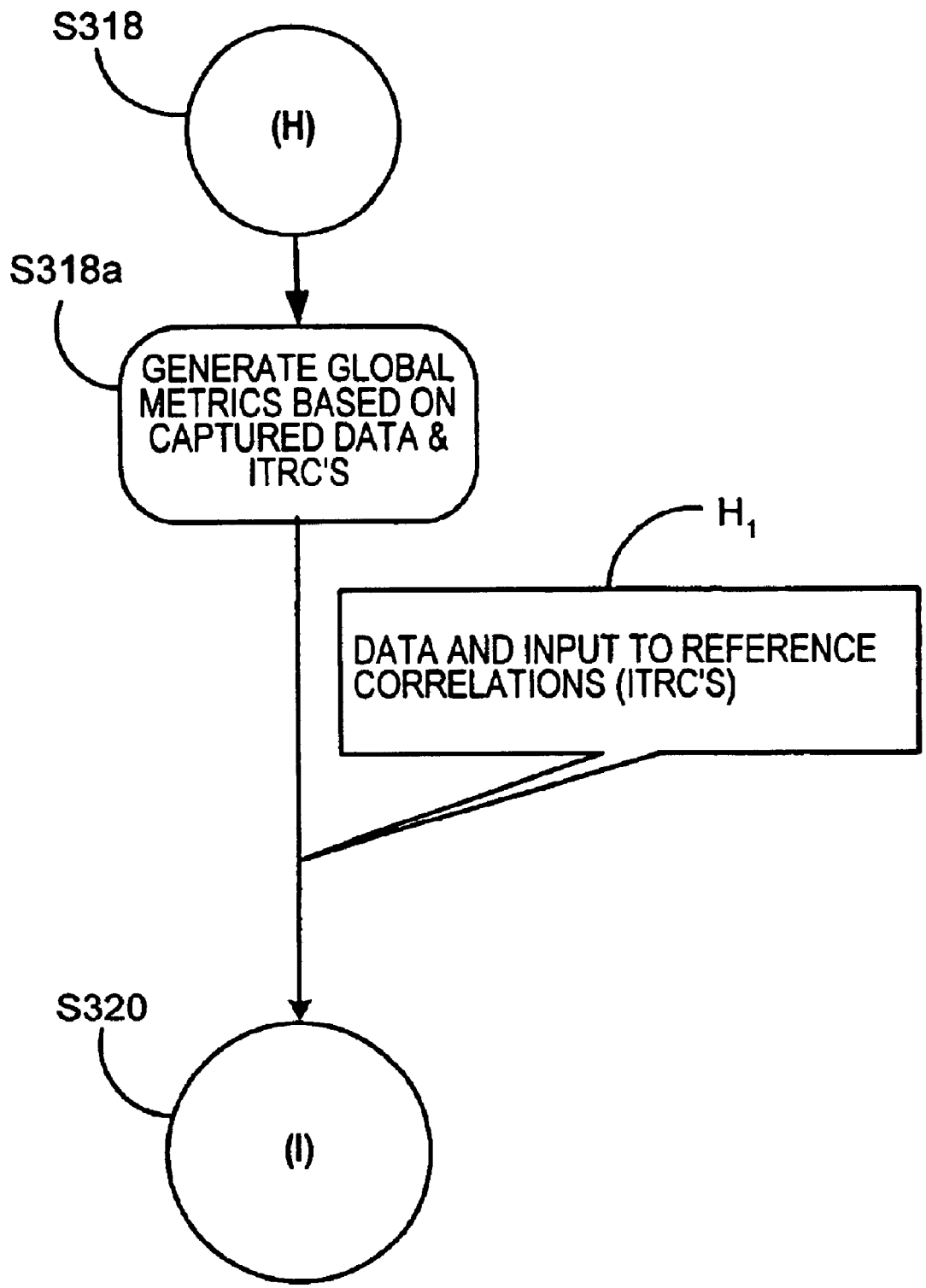

At step S316, also known as (G) Physical Abnormality Analysis, analysis is performed as is detailed in the flow chart of FIG. 6g. All areas previously analyzed (consignee address, 'From' address, and postage/postmark area), are removed from the images. This system then analyzes the remainder of the mailpiece (i.e. six side of an envelope), looking for markings, including but not limited to; wrinkles and stains, taped or repaired areas, protrusions, holes, and skew. Each of these separately analyzed features is again captured as a metric in step S316a. Caption G1 indicates that data and ITRCs or indicators are the result of this step. Following step S316a is Step (H) or S318 which ill be described below in the detailed description of FIG. 6h.

Following steps S308, S312, S314 and S316, illustrated in FIG. 5b, is step S318, also known as (H) Process Data and Metrics. The Process Data and Metric steps are performed as is detailed in the flow chart of FIG. 6h. At step S318a global metrics are generated based upon data and ITRCs or indicators from the analysis steps performed at S308–S316. This analysis includes but is not limited to checking mailpiece weight against mailpiece postage, checking the mailpiece postmark against the return address, and other logical informational comparisons. As a result, a set of data and metrics is produced as shown by caption $H_1$ of FIG. 6h. The application of the analysis in step S318a is governed by rules stored in a configuration database or parameters 204 shown in FIG. 5a. The rules are customizable by a user or operator of the system 200.

Figure 6I:
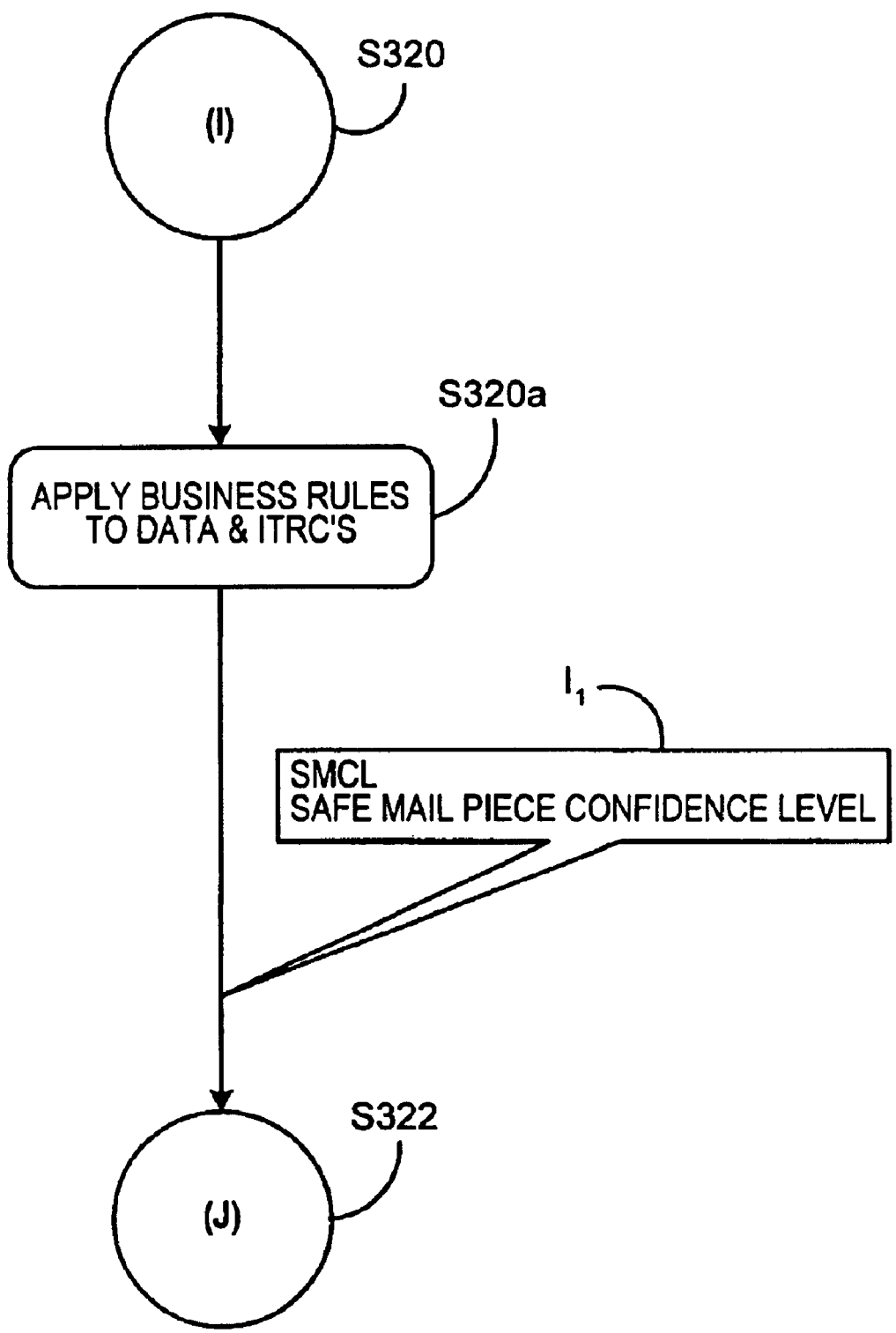

Following step S318 is Step (I) Apply Business Rules. Step (I) or S320 is further illustrated in FIG. 6i. At step S320a business rules are applied to data and ITRCs or indicators which were the output of step S318a. The output of the application of the business rules is a Safe Mail Confidence Level (SMCL) illustrated by caption $l_1$ of FIG. 6i. The steps of FIG. 6i are used to determine whether the mailpiece meets preset requirements for acceptability. The preset values are contained in the Business Rules Database 204 illustrated in FIG. 5a. The business rules database can be configured to meet a particular user's (i.e. customer or business) needs. In subsystem (i) a set of metrics is matched with a set of threshold values from the database. Each threshold value for a particular metric may be assigned an action (such as immediate removal to the suspect bin), or be used to as part of a larger set of threshold values to determine the overall viability of the mailpiece. Generally, the metric to threshold values are used to calculate the overall viability index of the mailpiece. Once this index is produced, it is matched against the final threshold index set by the customer. If the index is outside of the tolerable risk range, a value of REJECT is sent to the sorter, which would route the mailpiece to the suspect bin. If the index is within the tolerable risk range, a second set of metrics and data is used to determine if the mailpiece is useful (i.e. addressed to an individual that should get mailpiece), or not useful (i.e. address to a former employee, junk mailpiece, etc.). With this information either a value of ACCEPT is sent to the sorter to sort the mailpiece to the correct bin, or a value of JUNK is sent to the sorter to sort the mailpiece to the dead letter bin. Also performed as part of step S320 is, if a return address exists for the mailpiece, the return address is sent to the return address database 204 of FIG. 5a. A counter (not shown) for the appropriate category (i.e. accepted, rejected, junk) is incremented.

Returning to the flow chart of FIG. 5b, following step S220 is subsystem (J) or step S222 where a query is made as to how the mailpiece should be routed based upon the metric results and SMCL result of step S220. One of the purposes of step (J) is to manage and enforce safe handling of each mailpiece. The answer to the query of step S222 can be include, but is not limited to, email mailpiece images to a recipient, sort to mitigate, sanitize and seal, physical delivery, or send to dead bin. The routing steps are illustrated in steps S324, S326, S328, S330, S332, S334 and S336 of FIG. 5b.

If a determination is made at step S222 to send email images then at step S324, labeled (K) on the flow chart, images of all sides of the mailpiece are sent to the addressee. The addressee is allowed to make a decision as to whether the mailpiece should be physically delivered (such as by using step S330/S334 or another routing option should be used.

If a determination is made at step S222 to sort to mitigate, then at step S326 the mailpiece is sent to mitigation subsystem (P) shown in step S328 of FIG. 5b. Mitigation subsystem (P) can include, but is not limited to, sanitization and sealing of the mailpiece.

If a determination is made at step S222 to physically deliver the mailpiece, then at step S230 the mailpiece is delivered to an appropriate sort bin 18 and at step S334 the mailpiece is delivered by delivery personnel.

If a determination is made at step S222 to open the mailpiece, scan contents and deliver the scan via email to the addressee, then at step S332 the mailpiece is delivered to an appropriate bin 18 and then the open, scan and email steps of subsystem (N) are performed.

Figure 1C:
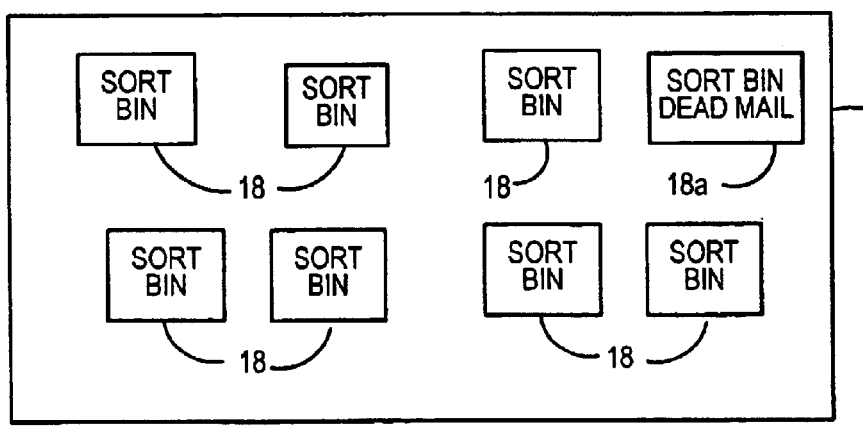
FIG. 1c is a block diagram illustrating a four bin module which may be part of the mailpiece sorting apparatus used to perform an embodiment of the present invention.

If at step 222 a determination is made to sort the mailpiece to a dead mailpiece bin, then at step S336 the mailpiece is delivered to a dead mailpiece bin 18a shown in FIG. 1c.

Detection and Mitigation Means for Chemical and Biological Agents

In addition to the previously described detection processes provided by OCR based and visible spectrum scanning analyses, the invention may include additional detection methods to further increase the confidence or probability level for establishing safe mail. Additional detection methods may be applied to all mailpieces or to mailpieces that have been identified as high risk based on the results of previous detection processes. Additional detection methods, placed within the boundaries of the incoming mail system, may include one or more of the following: 1) Electrochemical Transducers and Sensors; 2) Flame Conductivity; 3) Thermoelectric Conductivity; 4) Photo Ionization Detectors; Surface Acoustic Wave Sensors; 5) Gas Chromatography; 6) Ion Mobility, Raman, and Mass Spectroscopy; 7) IR and FTIR Spectroscopy; Fluorescence Spectroscopy; and/or 8) Colorimetry. For methods that use radiation passing through a gas, the gas can occupy space between incoming mailpieces or the space that exists in close proximity to the mailpieces.

The present invention may also include mitigation means to even further increase the confidence level for establishing safe mail. Mitigation means may be applied to all mailpieces or only to mailpieces that have been identified as high risk based on the results of previous detection processes. Mitigation means, placed within the boundaries of the incoming mail system, may include one or more of the following: 1) Sterilization with dry heat or autoclaving; 2) Irradiation, including but not limited to, electron beams, microwaves, gamma rays and X-rays; and/or 3) Chemical sprays, including but not limited to, mixtures of chlorine-calcium, formalin, or lye solutions. Mitigation methods may be applied to singular mailpieces or in bulk mailpiece lots, depending on decontamination success rates for mailpiece configurations and/or practical implementation issues.

The present invention provides a system and method for identifying potentially life harming mailpieces in an incoming mail stream. Another additional advantage of the present invention is that the negative impact of delayed mail delivery is reduced. It further provides the ability to protect recipients receipt of life threatening mailpieces. While the present invention has been disclosed and described with reference to a single embodiment thereof, it will be apparent, as noted above that variations and modifications may be made therein. It is, thus, intended in the following claims to cover each variation and modification that falls within the true spirit and scope of the present invention.

What is claimed is:

1. A system for sorting mailpieces and identifying potentially life harming mailpieces in an incoming mail stream, the system comprising comprising:

a component for singulating and feeding a mailpiece along a feed path of the system;

a system for reading and measuring the mailpiece, the system for reading and measuring the mailpiece positioned downstream from the component for singulating and feeding the mailpiece along the feed path; and one or more database operatively connected to the system, the one or more databases comprising configuration parameter data, analysis rules, address data and task data;

a control system determining whether the mailpiece is potentially life harming by comparing information read and measured from the mailpiece by the system for reading and measuring the mailpiece to one or more configuration parameters and create a mailpiece data file; and whereby the control system compares the mailpiece data file to rules stored in an analysis rule database and whereby the result of the comparison of the mailpieces data file and the rules stored in the analysis rule data base is indicative of a son destination of the mailpieces.

2. The system as claimed in claim 1 wherein the system for reading and measuring the mailpiece comprises a scale.

3. The system as claimed in claim 1 wherein the system for reading and measuring the mailpiece comprises a camera and optical character recognition system.

4. The system as claimed in claim 1 wherein the system for reading and measuring the mailpiece comprises a means for determining length of one or more sides of the mailpiece.

5. The system as claimed in claim 1 wherein the system for reading and measuring the mailpiece comprises a means for determining the stiffness of the mailpiece.

6. The system as claimed in claim 1 wherein the system for reading and measuring the mailpiece comprises a means for determining stability of center of gravity of the mailpiece.

7. The system as claimed in claim 1 whereby the configuration parameter data comprises weighted information for two or more handwriting characteristics.

8. The system as claimed in claim 1 whereby the configuration parameter data comprises weighted information for two or more return address characteristics.

9. The system as claimed in claim 1 whereby the configuration parameter data comprises weighted information for two or more addressee address characteristics.

10. The system as claimed in claim 1 whereby the configuration parameter data comprises weighted information for two or more postage characteristics.

11. The system as claimed in claim 1 whereby the configuration parameter data comprises weighted information for two or more image characteristics.

12. The system as claimed in claim 1 whereby the configuration parameter data comprises weighted information for two or more physical mailpiece characteristics.

13. A method of sorting mailpieces and identifying potentially life harming mailpieces in an incoming mail stream, the method comprising the steps of:

singulating and feeding a mailpiece along a feed path of the system;

reading and measuring the mailpiece as the mailpiece is positioned along the feed path; and determining whether the mailpiece is potentially life harming by comparing information read and measured from the mailpiece by the system for reading and measuring the mailpiece to one or more configuration parameters and creating a mailpiece data file; and comparing the mailpiece data file to one or more rules stored in an analysis rule database, the result of the comparing the mailpiece data file and the rules stored in the analysis rule data base is one or more indicators assigned to the mailpiece.

14. The method as claimed in claim 13 wherein the step of reading and measuring the mailpiece comprises weighing the mailpiece.

15. The method as claimed in claim 13 wherein the step of reading and measuring the mailpiece comprises scanning the mailpiece and performing optical character recognition.

16. The method as claimed in claim 13 wherein the step of reading and measuring the mailpiece comprises measuring the length of one or more sides of the mailpiece.

17. The method as claimed in claim 13 wherein the step of reading and measuring the mailpiece comprises determining a stiffness of the mailpiece.

18. The method as claimed in claim 13 wherein the step of reading and measuring the mailpiece comprises determining a stability of the center of gravity of the mailpiece.

19. The method as claimed in claim 13 wherein the step of comparing the mailpiece data file to rules stored in an analysis rule database further comprises comparing handwriting characteristics to handwriting rules to determine an indicator.

20. The method as claimed in claim 13 wherein the step of comparing the mailpiece data file to rules stored in an analysis rule database further comprises comparing mailpiece geometry to mailpiece geometry rules stored in an analysis rule database to determine an indicator.

21. The method as claimed in claim 13 wherein the step of comparing the mailpiece data file to rules stored in an analysis rule database further comprises comparing postage characteristics to postage rules stored in an analysis rule database to determine an indicator.

22. The method as claimed in claim 13 wherein the step of comparing the mailpiece data file to rules stored in an analysis rule database further comprises comparing physical characteristics to physical characteristic rules stored in an analysis rule database to determine an indicator.

23. The method as claimed in claim 13 further comprising the steps of determining a safe mailpiece confidence level based upon the one or more indicators assigned to the mailpiece.

24. A method of sorting mailpieces and identifying potentially life harming mailpieces in an incoming mail stream, the method comprising the steps of:

singulating and feeding a mailpiece along a feed path of the system;

reading and measuring the mailpiece as the mailpiece is positioned along the feed path;

determining whether the mailpiece is potentially life harming by comparing information read and measured from the mailpiece by the system for reading and measuring the mailpiece to one or more configuration parameters and creating a mailpiece data file;

comparing the mailpiece data file to one or more rules stored in an analysis rule database, the result of the comparing the mailpiece data file and the rules stored in the analysis rule data base is one or more indicators assigned to the mailpiece;

determining a safe mailpiece confidence level based upon the one or more indicators assigned to the mailpiece; and delivering the mailpiece to an appropriate destination bin based upon the safe mailpiece confidence level assigned to the mailpiece.

* * * * *